July 3, 1962 — W. E. PARRY — 3,042,809
CURRENT SENSING MARGINAL CHECK CONTROL SYSTEM
Filed May 14, 1959 — 4 Sheets-Sheet 1

FIG. 1

INVENTOR
WALTER E. PARRY
BY SUGHRUE, ROTHWELL,
MION AND ZINN
ATTORNEYS

FIG. 2

July 3, 1962 W. E. PARRY 3,042,809
CURRENT SENSING MARGINAL CHECK CONTROL SYSTEM
Filed May 14, 1959 4 Sheets-Sheet 3

FIG. 5   RELAY TIMING DIAGRAM FOR BOOST OPERATIONS

United States Patent Office 3,042,809
Patented July 3, 1962

3,042,809
CURRENT SENSING MARGINAL CHECK CONTROL SYSTEM
Walter E. Parry, La Grangeville, N.Y., assignor to International Business Machines Corporation, New York, N.Y., a corporation of New York
Filed May 14, 1959, Ser. No. 813,245
8 Claims. (Cl. 307—80)

This invention relates to a marginal check circuit for use in systems wherein it is desired to vary a normally fixed supply voltage so as to determine and discover defective components. More specifically, the invention utilizes an auxiliary variable power supply which may be put in series circuit with the normal supply voltage while the machine is in actual operation in such a manner that undesirable voltage and current transients are avoided.

In recent years, the use of high speed computing machinery having numerous electronic components has led to the recognition that potentially defective components must be discovered before they actually cause failure within the machine in order to decrease the down time. One criterion of dependability of such components, especially vacuum tubes, is their ability to operate in satisfactory manner with supply voltages above or below the normal optimum value. Therefore, it has become standard procedure to employ means for varying a normally fixed supply voltage so as to discover and localize any component failures during a test operation before such a component fails during an actual computing operation. Such a test operation may require that a supply voltage be either increased or decreased in value. One of the standard prior art techniques for accomplishing this type of test is to insert a variable auxiliary power supply in either series aiding or series opposing relationship with the supply voltage to be checked, and then changing the auxiliary voltage so as to either boost or buck the bias voltage. This of course raises or lowers the total supply voltage which is applied to the load.

In such marginal check auxiliary power supply systems as described above, it would be desirable to connect the marginal check power supply into the load circuit while the machine is actually operating upon data. Such a feature would not only allow the operator to marginally check the bias voltage during a specific test operation, but would also give him the option of conducting such a checking operation while the machine is actually running through a normal operational program. However, in the prior art, the coupling of an auxiliary power supply into the load circuit during operation has resulted in voltage or current transients being generated at the time of connection such that the machine very often will indicate an error even though there might not actually be any components whose reliability falls outside of the marginal check criterion. Thus, the normal procedure when using an auxiliary marginal check power supply has been to stop the machine, connect the marginal check power supply in series with the load, and then begin again the operation. Even during a test operation, this may result in substantial waste of time and money. Furthermore, it is quite possible that in some programs it would be impossible to stop the machine and then begin again at exactly the point of termination.

It is therefore an object of this invention to provide a marginal check system which has an auxiliary power supply adapted to be connected in the supply load circuit during operation without the occurrence of transient voltages or currents which may cause an error in the system which is not a result of defective components therein.

It is another object of the invention to provide apparatus for selectively coupling an auxiliary source of electrical energy intermediate a load and a primary source of electrical energy, with said primary source supplying said load with current in a predetermined direction, which comprises a circuit including a normally closed switch coupling said primary source and said load for the passage of said current therethrough, means coupling said auxiliary source to said circuit whereby said auxiliary source is effective to supply current to said circuit opposing said load current, and means effective when the net current in said circuit is substantially zero for opening said switch.

It is a further object of the invention to provide a marginal check system in which an auxiliary power supply can be inserted into the load circuit during operation in either a boost or buck relationship therewith.

Other objects and advantages of the invention will be pointed out in the following description taken with reference to the accompanying drawings, in which.

The system generally will now be described. A novel circuit is used to connect the normally fixed supply voltage with its load in the system to be checked. The load current normally flows through a portion of this connecting circuit. The auxiliary marginal check power supply is then connected in parallel with the connecting circuit so as to essentially oppose the load current flowing therethrough. The impedance of the auxiliary power supply at this point is much higher than that of the parallel connecting circuit so that the connection is made with no disturbance to the load circuit. Upon increasing the magnitude of the marginal check voltage in a slight degree, the effective current flowing through the connecting circuit becomes zero, thus causing the connecting circuit to open so as to put the auxiliary power supply directly in series with the load and the normal supply voltage. In this case, the load current completely flows through the auxiliary power supply, but the operation has been so performed such that transients have not developed. The auxiliary power supply may then be increased in magnitude so as to boost the normal supply voltage. During a bucking operation, the auxiliary power supply is again introduced to the connecting circuit as above described, but immediately upon the connecting circuit being opened, the auxiliary power supply voltage is returned to zero and its polarity reversed. The magnitude of the auxiliary voltage is again increased but this time it opposes or bucks the normal supply voltage. When disconnecting the auxiliary power supply from the load circuit, it is also essential to avoid transients. Therefore, a portion of the connecting circuit is again utilized in conjunction with the auxiliary power supply so as to determine the time when the connecting circuit should be closed in order to initiate again the continuity between the normal power supply and the load. In other words, the auxiliary power supply is again placed in parallel with the closed connecting circuit and is then subsequently disconnected entirely without affecting the current in the load itself.

Figure 1:
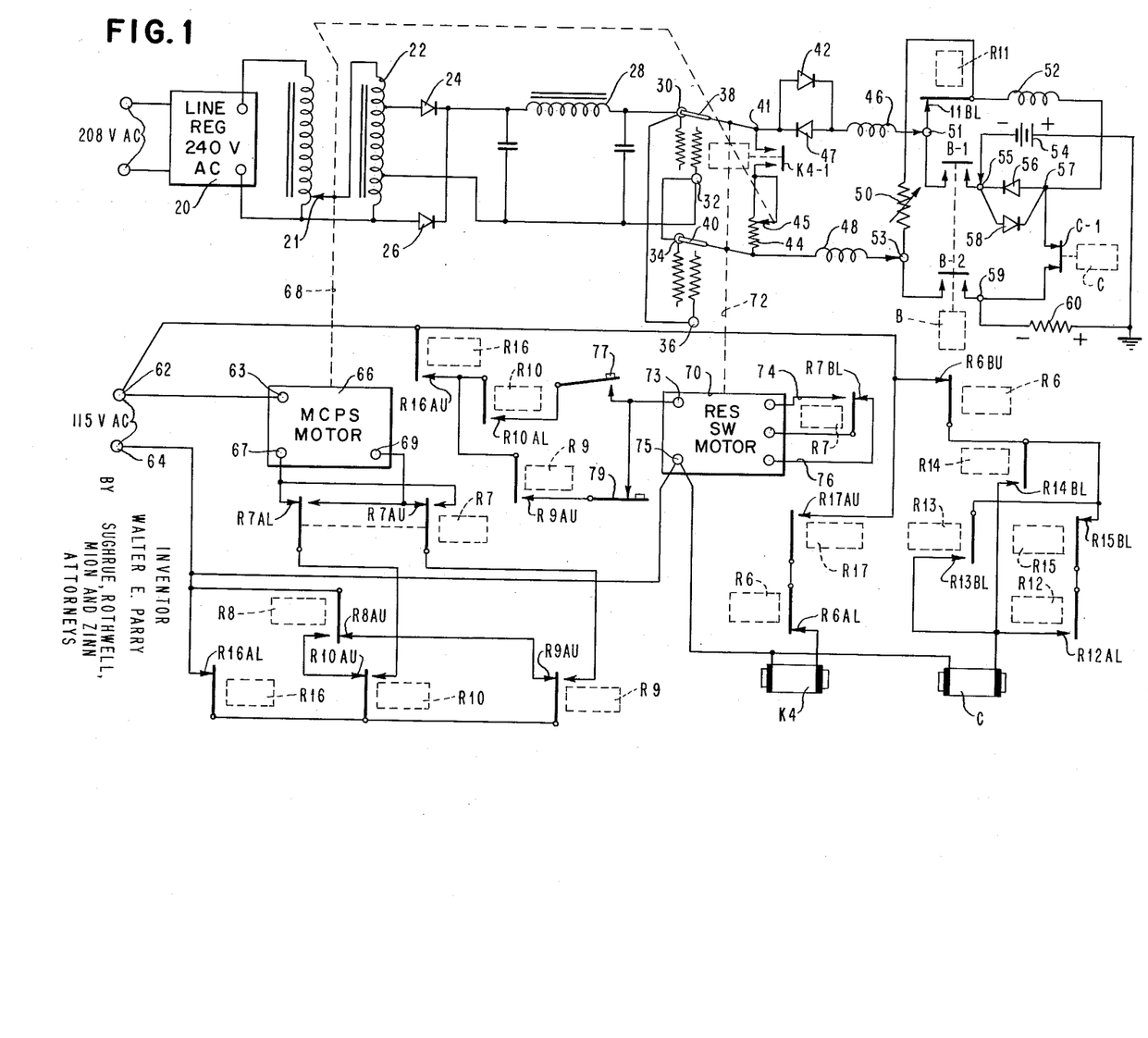
FIGURE 1 shows an auxiliary marginal check power supply and its manner of connection into the load circuit.

Referring now to FIGURE 1, the auxiliary marginal check power supply will be described together with the novel circuit connecting the normal supply voltage with the load. In the marginal check power supply, a line voltage regulator 20 provides a transformer, generally indicated by 22, with an alternating voltage. The magnitude of the voltage appearing on the secondary of this transformer 22 is determined by the position of wiper arm 21 which moves with respect to the transformer primary. Diodes 24 and 26 are connected so as to rectify the secondary voltage, which is then led to a filter generally indicated by 28. Terminals 30 and 36 from the filter 28 are positive with respect to terminals 32 and 34. A double-pole, double-throw reversing switch having contacts 38 and 40 is provided so as to reverse this polarity at terminals 41 and 43 during a buck operation. A relay contact K4–1 connects a rheostat 44 across terminals 41 and 43 during a buck operation, so as to provide the proper value of resistance as determined by the setting of wiper arm 21. Because current flow thru rectifier type power supplies is unidirectional, they may be connected in series only if their output voltages are additive. When the output of one is used to buck or subtract from the output of another, it is necessary to connect a resistance across the output of the bucking supply. The value of this resistance will be dependent upon the load current of the bucked supply and the output voltage of the bucking supply. Rheostat (44) is the resistance across the bucking supply with (45) providing the proper value as a function of output voltage. Front-to-back diodes 42 and 47 are connected in parallel fashion in order to perform an impedance matching function when the marginal check power supply is connected into the load circuit. Coils 46 and 48 are current sensing elements in the marginal check circuit breaker, but a discussion of their functions is not essential to the understanding of the present invention. The wiper arms 21, of transformer 22, and 45, of rheostat 44, are ganged together so as to be moved by the marginal check power supply motor 66. The marginal check power supply motor 66 may move wiper arm 21 in either direction, depending upon which pair of its terminals 63 and 67, or 63 and 69 is energized. An alternating voltage is applied to terminals 62 and 64. Common terminal 63 of the power supply motor 66 is attached to terminal 62. A gating matrix consisting of relay switches which are selectively energized by relays 7, 8, 9, 10 and 16 (FIGURE 2), directs the voltage applied at terminal 64 to one of the terminals 67 or 69 of the power supply motor. Thus, if terminals 63 and 69 of the motor are energized by the voltage appearing at terminals 62 and 64, then the wiper arm 21 of transformer 22 moves in an upward direction so as to increase the magnitude of the marginal check power supply voltage. Conversely, if terminals 63 and 67 of the motor are energized, then the wiper arm 21 moves in a downward direction so as to reduce the marginal check voltage to zero.

The polarity of the voltage appearing at terminals 41 and 43 is determined by the position of the double-pole, double-throw switch previously described, which in turn is positioned by the switch motor 70 through arm 72. Arm 72 moves up or down when terminals 73 and 75 are energized by an alternating voltage, depending upon whether switch armature 7BL contacts terminals 76 or 74, respectively. Armature 7BL is operated by relay 7 in FIGURE 2. Terminal 75 of the switch motor 70 is always connected to terminal 64 of the entering A.C. voltage. Terminal 73, however, is selectively energized from terminal 62 through a relay switch matrix controlled by relays 16, 10, and 9, together with switches 77 and 79. When arm 72 is up, thus positioning the double-pole, double-throw switch as shown in FIGURE 1, then the switch 77 is opened and switch 79 is closed, as shown. When the double-throw, double-pole switch is moved down so as to contact terminals 32 and 36, then switch 79 is opened while switch 77 is closed.

Still referring to FIGURE 1, the construction of the circuit connecting the load and normal supply voltage will now be described. A system load 60 may be connected to ground on one side, while the other side of the load is connected to one terminal 59 of the switch contact C–1. The other terminal 57 of this switch contact is connected to a pair of front-to-back diodes 56 and 58 which are connected in parallel. The normal supply voltage 54, which is associated with the system load 60, is also connected to ground on one side and to the other side of the diodes 56 and 58 at terminal 55. If the supply voltage to the load 60 is negative for purposes of this discussion, then the polarity of voltage 54 is as shown. Armature C–1 is controlled by relay C so as to either open or close the path between the system load 60 and its associated voltage supply 54. The auxiliary marginal check power supply voltage is introduced at terminals 51 and 53 which in turn may be connected to or disconnected from terminals 55 and 59 according to the position of relay contacts B–1 and B–2. One side of a sense relay coil 52 is connected to terminal 57 between the parallel diodes and switch C–1, while the other side of coil 52 may be connected to terminal 51 depending upon the position of switch contact 11BL. A constant current resistance 50 is connected between terminal 53 and this other side of coil 52. Switch contacts B–1 and B–2 are operated by relay B in FIGURE 2.

The non-linear $E/I$ characteristics of the constant current resistance 50 limits the current through the sense relay 52 as the magnitude of the marginal check voltage varies. Diode 56 provides signal voltage for the operation of sense relay 52, while diode 58 provides a current path when relay 52 is functioning as a voltage sensing element. Diode 42 is required in order that the voltage drop across diode 56 is not changed when contactors B–1 and B–2 close. Its effect is to provide a very high impedance for the marginal check power supply at the time these contactors close, so that the parallel connection is made with no disturbance to the load circuit. Diode 42 is especially important when the load current being biased is small. Diode 47 clamps any reverse voltage which may appear across diode 42.

Figures 3A, 3B, 3C:
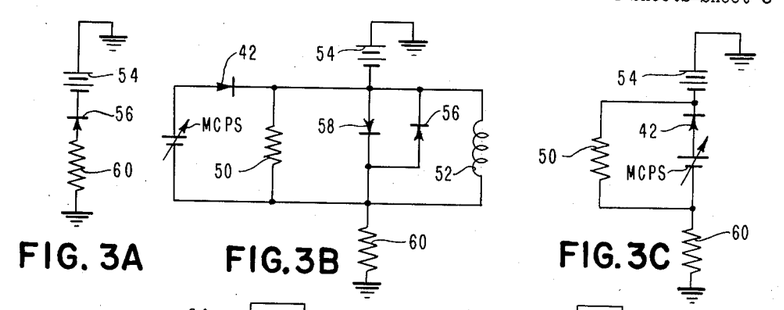
FIGURES 3a, 3b, 3c, 4a and 4b show simplified circuit diagrams of the apparatus in FIGURE 1 during different intervals of operation.

The operation of this load connecting circuit will now be described with reference to FIGURES 3 and 4. In normal operation, when it is not desired to marginally check the supply voltage 54, the switch contact C–1 is closed as shown, while contacts B–1 and B–2 are open. The system load 60 is therefore connected to its associated supply voltage 54 through the closed contactor C–1 and the diode 56 which is forward biased. In FIGURE 3A is shown the active or effective portion of this circuit during such normal operation. The same numbers have been applied to components in FIGURE 3A corresponding to similar components in FIGURE 1. Since contactors B–1 and B–2 are in the open position, both the sense relay coil 52 and the marginal check supply voltage are not included within the circuit shown in FIGURE 3A. However, when it is desired to boost the voltage of the power supply 60 by means of the auxiliary marginal check power supply, the following steps occur.

Contactors B–1 and B–2 are closed so as to effectively place the auxiliary marginal checking power supply in parallel with the diodes 56 and 58 as shown in FIGURE 3B. Also the closing of these B contactors places the sense coil 52 in shunt relationship with the said diodes. Resistance 50 is further connected in parallel with the above circuit, since switch 11 BL is closed at this time. At the instant that the B contactors are closed, the voltage magnitude of the marginal check power supply is approximately zero. After its connection to the load circuit, however, the magnitude of the marginal check voltage is increased. A portion of the current due to this increasing marginal check voltage flows in a downward direction through the diode 58 and through sense coil 52 in opposition to the current flowing upwards through diode 56 and sense coil 52 which is due to the normal supply voltage 54. When the marginal check voltage has reached only a very small value, its downward current in these two above identified branches approximately equals the normal supply current flowing upwards through these same two branches. In this case, the net effective current flowing through the branch composed of diodes 56 and 58 and the branch composed of sense coil 52 is approximately zero, and the voltage drop across them is also zero. The sense coil 52 senses this condition and causes the contactor C–1 to open. Upon the opening of contactor C–1, the effective load circuit appears as in FIGURE 3C with the above two branches of FIGURE 3B being removed from their shunt relationship with the marginal check power voltage. Since there was effectively no current flow in either of these two branches, their removal from the circuit does not change the value of the current flowing through load 60. As shown in FIGURE 3C, a load current now flows through the shunt combination of resistance 50 and the marginal check power supply in series with the normal supply voltage 54. The marginal check voltage may now be increased in value to any desired amount so as to effectively increase the value of the total supply voltage applied to the load 60. No undesirable transients or surges of current have appeared in the load 60 throughout this entire operation, since the shunt connection of the marginal check power supply in FIGURE 3B does not change the current through load 60, and the opening of contactor C–1 in FIGURE 3C also does not affect the load current because of reasons described above.

Figure 4A:
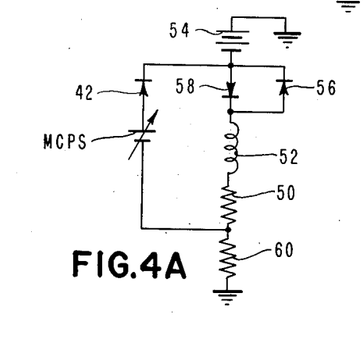
Figure 4B:
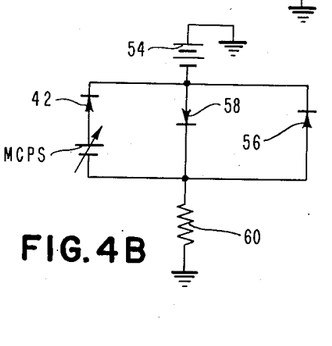

When it is desired to remove the marginal check voltage supply from the effective circuit shown in FIGURE 3C, the following operations occur. Switch 11BL in FIGURE 1 is open, thus connecting one side of the sense coil 52 to the negative terminal of the marginal check power supply through the constant current resistance 50. The other side of the sense coil 52 is connected to the front-to-back diodes 56 and 58 which in turn are connected to the positive terminal of the marginal check voltage. The effective circuit at this time is shown in FIGURE 4A. At the time when the circuit is transformed from that shown in FIGURE 3C to that shown in FIGURE 4A, the polarity of the marginal check voltage is such that it will cause a portion of its current to flow in a downward direction through the branch consisting of the front-to-back diodes 56 and 58, sense coil 52, and resistance 50 in opposition to the current flowing upwards through this branch due to the normal power supply 54. Furthermore, the magnitude of the marginal check voltage at this time is normally such that the net effective current through this right-hand branch will not be zero, thus causing sense relay coil to actuate various relays in the control circuit. The marginal check voltage is then reduced toward zero. This reduction eventually results in the downward current through the right-hand branch being approximately equal to the upward current through that branch so that the net effective current therein is zero. At this time the magnitude of the marginal check voltage is quite small. The sense coil does not function any longer and contactor C–1 is again closed, such as is shown in FIGURE 1. The closing of contactor C–1 shorts out the resistance 50 and sense coil 52 and re-establishes the continuity between the supply voltage 54 and the load 60, such as shown in FIGURE 4B. The magnitude of the marginal check voltage is reduced to zero, after which contactors B–1 and B–2 are opened so as to return to the effective circuit shown in FIGURE 3A.

The bucking operation, in which the marginal check power supply is connected in series opposing circuit with that of the bias voltage 54, is similar in nature to the boost operation just described, and will be fully amplified in the subsequent discussion of the over-all operation of this invention.

FIGURE 1 further shows relay C which is used to operate contactor C–1 previously described. Its energization depends upon the relay switch matrix composed of armatures controlled by relays 6, 12, 13, 14, and 15, whose operation will subsequently be discussed. Relay K4 is also shown being selectively energized by relays 6 and 17.

Figure 2:
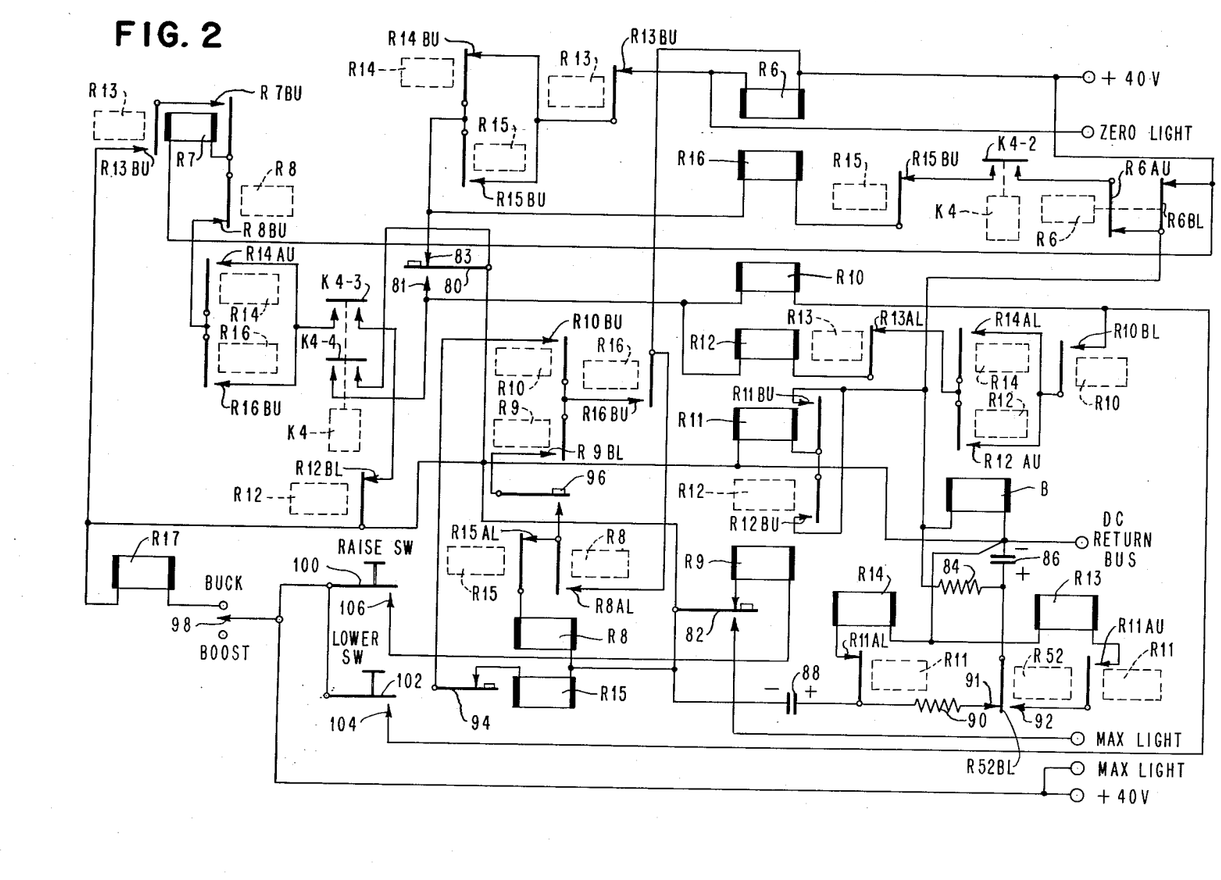
FIGURE 2 shows the control and timing circuits for the apparatus shown in FIGURE 1.

Turning now to FIGURE 2, the construction of the control relays for effecting the operational steps above-described will now be discussed. A BUCK/BOOST switch 98 is provided so that the operation desired may be selected. The switch 98 is connected to a source of positive potential, and the BUCK terminal is connected through relay 17 to the return bus, or ground, of this potential. The BOOST terminal is floating. A RAISE switch 100 is provided so as to connect the marginal check power supply into the load circuit in either a boost or buck operation. The LOWER switch 102 is provided when it is desired to disconnect the marginal check voltage from the load circuit. Both the RAISE switch 100 and the LOWER switch 102 are connected to a positive potential. Terminal 106 of the RAISE switch 100 is connected to the D.C. return bus through relay 9 and UP-LIMIT switch 82 which is normally in the position shown in FIGURE 2. Terminal 104 of LOWER switch 102 is connected through relay 10 to the bottom terminal 81 of the switch 80. Switch 80 contacts terminal 83 only when wiper arm 21 of transformer 22 in FIGURE 1 is at its bottom zero voltage position as there shown. When wiper arm 21 moves off of its zero position, then a synchronized cam action allows the switch 80 to open and contact terminal 81. Switch 80 is connected to the D.C. return bus. The upper limit switch 82, previously mentioned, will remain contacting its bottom terminal unless the wiper arm 21 of transformer 22 reaches its top maximum voltage position, at which time switch 82 is moved by cam action so as to contact its upper terminal and so stop the motion of wiper arm 21.

Relay B, which controls the operation of contactors B–1 and B–2 in FIGURE 1, is shown in the following circuit of FIGURE 2. One side of relay B is connected to a first terminal of switch 6BL while the other side of this coil is returned to the circuit ground. The second terminal of switch 6BL is connected to a positive potential. Also, one side of a resistance 84 is connected to the first terminal of switch 6BL. The other side of resistance 84 is connected to one side of capacitor 86, the other side of which is connected to the D.C. return bus. The capacitor side of resistance 84 is also connected to switch 52BL which is operated by the sense coil 52 in FIGURE 1. Terminal 91 of switch 52BL is connected to one side of resistance 90, the other side of which is connected to capacitor 88 having one plate connected to the D.C. return bus. The capacitor side of resistance 90 is further connected to one terminal of switch 11AL, which is connected through relay 14 to the D.C. return bus. Terminal 92 of switch 52BL is connected to one terminal of switch 11AU which in turn is connected through relay 13 to the D.C. return bus. The purpose of the time constant resistance capacitance combinations 84—86, and 90—88 is to provide a time delay which is needed to effect the proper operation of relay 14. This operation subsequently will be described.

Switches 94 and 96, which are in the circuits of relays 15 and 8, respectively, are actuated by the double-throw, double-pole switch 38—40 which is shown in FIGURE 1. When this double-pole switch is in the position as shown, then switches 94 and 96 are in the positions as shown in FIGURE 2. However, when actuating bar 72 has moved downward so as to move the double-pole switch to its lower position, then switch 94 is opened and switch 96 is closed. These two switches are used in conjunction with other switches operated by relays 9, 10, and 16 so as to control the energization of relays 8 and 15 during the buck operation.

Relays 7 and 16 are also used only during the buck operation. It will be noted that both energization circuits of these two relays require that contacts K4–3, K4–2, respectively, be closed. The closing of these two K contacts is effected by energizing relay K4 in FIGURE 1. In order to energize relay K4, switch 17AU must be closed, and this depends upon relay 17 being operated through the BUCK terminal of the BUCK/BOOST switch. Relay K4 also causes switch K4–1, in FIGURE 1, to close which thus places the rheostat 44 in shunt relationship with the marginal check power supply so as to derive the proper bucking voltage therefrom.

The complete operation of this invention will now be described with reference to the relay timing diagrams of FIGURES 5 and 6. For purposes of this description, the showing of the switch armatures in FIGURES 1 and 2 are representative of the contacts made by them when their associated relays are not energized. Furthermore, in the relay timing diagrams, a relay is considered to be energized during a time interval when the bar line associated therewith is in its upper position.

Figure 5:
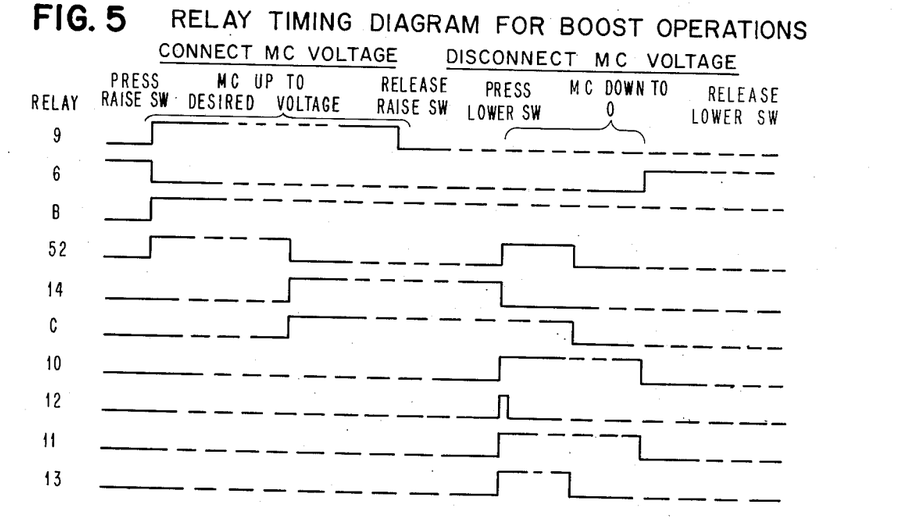
FIGURE 5 shows the relay timing diagram of the control circuit during a boost operation.

Referring now to FIGURES 1, 2, and 5, the boost operation will be described. The BUCK/BOOST switch 98 is moved so that it contacts the BOOST terminal. At this time, the marginal check system is in the following state: wiper arm 21 of transformer 22 is stationary and is resting at its zero voltage position as shown in FIGURE 1. The double-pole, double-throw switch contacts 38 and 40 are in the position as shown so that terminal 41 will be at a higher potential than terminal 43 when the voltage begins to increase. With the exception of relay 6, no relays in either FIGURE 1 or FIGURE 2 are energized. Relay 6 is energized because a circuit is completed from a positive potential through relay 6 and contacts 13LU, 14BU, and switch 80 which contacts terminal 83. Switch 80 is in the position as shown because wiper arm 21 is resting at its zero position. Furthermore, no power is being supplied to the marginal check motor 66 or to the switch motor 70. The effective circuit which connects the voltage supply 54 to load 60 is as shown in FIGURE 3A.

RAISE switch 100 is now depressed, thus energizing relay 9 through terminal 106 and switch 82 to ground. Switch 9AU changes position and applies power from terminal 64 to terminal 69 of motor 66 through switch 7AU. With the application of power to the terminals 63 and 69, the marginal check motor 66 moves wiper arm 21 off of its zero position and thereafter begins to increase the magnitude of the marginal check voltage. As soon as wiper arm 21 moves off of its zero position, the LOW LIMIT switch 80 is moved so as to contact terminal 81. This change of switch 80 disconnects the circuit of relay 6 from the D.C. return bus and thereby de-energizes relay 6. Switch 6BL now closes and applies a positive potential to relay B and to the time constant circuits. When relay B is energized, contacts B–1 and B–2 are closed so as to connect the marginal check power supply in parallel with the load circuit, such as is shown in FIGURE 3B. Power is also supplied through switch 6BL to relay 14 by means of resistance 84, switch 52BL, resistance 90, and switch contacts 11AL. However, due to the time constant circuits composed of resistance 84, capacitance 86 and resistance 90, capacitance 88, the relay 14 is not immediately energized. Before relay 14 can become fully energized so as to activate its associated switch armatures, switch 52BL has changed position so as to contact terminal 92, thus preventing relay 14 from becoming energized at this moment. Switch 52BL has changed position at this time because sense coil 52 immediately becomes energized as soon as the marginal check power supply has been connected in circuit by contactors B–1 and B–2. RAISE switch 100 remains depressed so as to continually energize relay 9 and thus cause the marginal check motor 66 to continually increase the magnitude of the marginal check voltage. This magnitude increases until sense coil 52 does not detect any current flowing therein, such as was previously described. At this time, switch 52BL is returned so as to contact terminal 91, thus supplying power to relay 14. Switch 14BL is eventually closed so as to energize the relay C through closed contacts 6BU. When relay C is energized, contactor C–1 is opened so as to effectively place the marginal check voltage supply in series with the load and with the voltage supply 54 such as is shown in FIGURE 3C. The magnitude of the marginal check voltage at which this step is performed is quite small, and the operator thereafter continues to depress RAISE switch 100 so as to increase this marginal check magnitude to the desired boost voltage. Upon reaching the desired boost voltage, RAISE switch 100 is released so as to deenergize relay 9 and thus inhibit the application of power to MC motor 66. Since wiper arm 21 is no longer at the zero position, switch 80 remains contacting terminal 81 so as to prevent relay 6 from again becoming energized. Since switch 6BL is closed when its associated relay 6 is not energized, power is continually applied to relay 14 so as to operate it and thus maintain contactor C–1 in its open position.

When it is desired to disconnect the marginal check power supply from the load circuit after a boost test has been performed, the following operations occur. LOWER switch 102 is depressed so as to apply power to relay 10. Since switch 80 is at this time contacting terminal 81, a circuit will be completed to ground that will energize relay 10. Switch 10BL will close. Furthermore, since relay 14 has been energized during the above described raise operations, switch contacts 14AL are also closed. A circuit is therefore also completed from the LOWER switch 102 through relay 12 and switch 80 to the D.C. return bus. Switch 12AU closes so as to provide a holding circuit for relay 12 in case relay 14 is deenergized. Switch 12BU in the circuit of relay 11 is also closed so as to complete a circuit through relay 11 from closed switch 6BL to the D.C. return bus. Upon the operation of relay 11 switch 11BU closes to provide a holding circuit. Switch 11BL is opened so as to connect the sense coil 52 to the negative terminal 53 of the marginal check power supply through resistance 50. The effective load circuit is now as shown in FIGURE 4A. Switch 11AL also opens so as to disconnect and deenergize relay 14. However, current has begun to flow through sense coil 52 as soon as switch 11BL is opened so that switch 52BL is moved to contact terminal 92. A circuit is now completed from switch 6BL to relay 13 through the closed switch 11AU. Switch 13BL thereafter closes so as to continue energizing relay C. Switch 13AL is opened so as to de-energize relay 12. It will further be noted that when relay 12 is energized, switch 12AL is closed so as to help hold the relay C. Switch 12AL is provided to insure that relay C does not become de-energized between the time that relay 14 is de-energized and relay 13 is energized.

When relay 10 has been energized by the LOWER switch 102, switch 10AU is moved so as to contact its right-hand terminal. This action by switch 10AU causes power to be applied to terminal 67 of marginal check motor 66 through switch 7AL. Power applied to terminals 63 and 67 causes motor 66 to begin moving wiper arm 21 down to its zero position. LOWER switch 102 is held depressed until the magnitude of the marginal check voltage decreases to a value which allows sense coil relay 52 to detect a net current of zero and thus to become deenergized, as explained above. Upon coil 52 becoming de-energized, switch 52BL again moves so as to contact terminal 91, thus de-energizing relay 13. Relay 14 is not energized at this time because relay 11 is energized so as to open switch 11AL. Upon switch 13BL opening, the circuit to relay C is broken so as to allow contactor C–1 to close. The effective load circuit now appears as in 4B. The LOWER switch 102 is held depressed until wiper arm 21 comes to its zero position. At this time, switch 80 returns to contact terminal 83 and thus complete a circuit through relay 6 since relays 14 and 13 are not energized at this time and switches 14BU and 13LU are closed. When relay 6 again becomes energized, switch 6BL opens so as to drop relay 11. Furthermore, when 6BL opens, relay B is also de-energized so as to open contactors B–1 and B–2. When switch 80 leaves terminal 81, this de-energizes relay 10 so as to disconnect the marginal check motor 66 from its source of energizing voltage. The effective load circuit is now as shown in FIGURE 3A.

Figure 6:
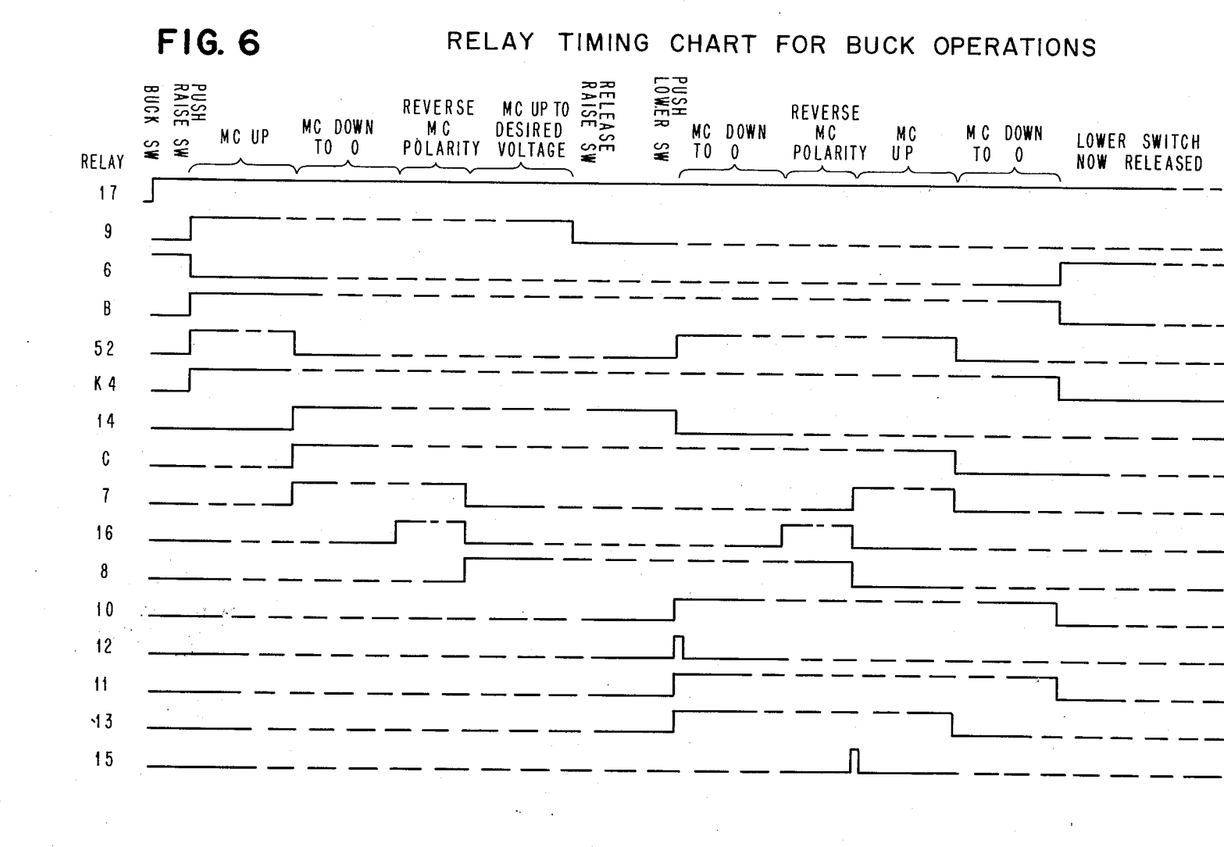
FIGURE 6 shows the relay timing diagram of the control circuits during a buck operation.

Reference will now be made to FIGURE 6 for purposes of explaining the marginal check buck operation. The BUCK/BOOST switch 98 is moved so as to contact the BUCK terminal and so energize relay 17. At this time, the marginal check system is in the same state as was described in connection with the beginning of a boost operation, with the exception that now both relay 6 and relay 17 are energized. RAISE switch 100 is now depressed so as to energize relay 9 and move wiper arm 21 off of its zero position. Relay 6 drops out due to the opening of switch 80 and relay B is thus picked up as described above. Switch 6AL also closes and thus energizes relay K4 through closed contacts 17AU. Switch K4-1 is closed by virtue of relay K4 being picked up so as to insert rheostat 44 in parallel with the marginal check voltage in order to adjust the voltage output therefrom. The effective load circuit is now as shown in FIGURE 3B. The value of the marginal check voltage eventually increases to a magnitude such that the sense coil 52 no longer detects a current flow therethrough so as to return switch 52BL into contact with terminal 91. Relay 14 is therefore energized and contactor C-1 is opened so as to create the effective load circuit shown in FIGURE 3C. The polarity of the marginal check voltage is at this time as shown in FIGURE 3C.

Immediately upon relay 14 being energized, switch 14AU is closed so as to energize relay 7 through switch 8BU, switch 12BL, and switch K4-3 which has been closed due to the energization of relay K4. When relay 7 is thus energized, switch 7AU is changed so as to direct the alternating potential from switch 9AU to terminal 67 of motor 66. This immediately reverses the direction of the motor so as to bring wiper arm 21 back down to its zero position. It should be appreciated that RAISE switch 100 has been continually depressed during this time so that relay 9 and its associated contact 9AU may continue to complete the energizing circuit of motor 66. Upon the arrival of wiper arm 21 at its zero position, switch 80 is again moved so as to contact terminal 83. This does not energize relay 6 at this time due to the fact that relay 14 is still energized so as to open switch 14BU. However, relay 16 is energized through switch 80 and terminal 83 since switches 15BU, 6AU, 6BL, and K4-2 are now closed. This allows switch 16AL to open so as to de-energize marginal check motor 66 in order to prevent injury to the wiper arm and transformer. Switch 16AU closes, thus applying voltage from terminal 62 to terminal 73 of switch motor 70 through closed contacts 9AU and 79. The direction of rotation of switch motor 70, and the subsequent up or down position of the double-pole, double-throw switch 38 and 40, is dependent upon the position of switch 7BL. Since relay 7 is now energized, switch 7BL will contact terminal 74 so as to cause the double-pole switch to be moved in downward fashion in order to contact the terminals 32 and 36 and thereby reverse the polarity at terminals 41 and 43. Furthermore, upon the double-pole switch being brought to the downward position, switch 77 is closed and switch 79 is opened so as to de-energize switch motor 70.

The down position of the double-pole switch also opens switch 94 and closes switch 96 which are in the circuits of relays 15 and 8, respectively. Since switch 16BU is now closed, the closing of switch 96 provides energizing current to flow through relay 8 by virtue of switches 9BL and 15AL also being closed. Switch 8AL closes so as to form a holding circuit for relay 8. Switch 8BU is now open so as to de-energize relay 7. Switch 8AU is moved so as to contact its left-hand terminal and thus supply power to terminal 69 of motor 66 through switches 10AU, 9AU, and 7AU (now de-energized). Wiper arm 21 now begins to move up and away from its zero position so as to cause switch 80 to leave terminal 83 and move to contact terminal 81. This operation of switch 80 breaks the circuit to relay 16 so as to allow it to become de-energized. Switch 16BU is now opened, however, the circuit through relay 8 is continued by holding switch 8AL which previously was closed. As wiper arm 21 continues to move upward, the magnitude of the marginal check voltage increases. Its polarity, however, has been reversed so that now it effectively bucks the normal supply voltage 54 in a circuit similar to the one shown in FIGURE 3C. The operator continues to depress RAISE switch 100 until the desired voltage across load 60 is reached.

It is therefore noted from the above description of the buck operation that the initial step is quite similar to that of the boost operation. The marginal check circuit is first connected in parallel with the load circuit and the sense coil 52 causes contactor C-1 to open so as to place the marginal check voltage in series aiding circuit to the supply voltage 54. The total voltage on the load at this time will be of a magnitude which is slightly greater than the normal voltage source 54. The marginal check voltage is then returned to zero while still in a series aiding circuit and its polarity reversed. Thereafter, it is again increased in magnitude but this time it series opposes the normal supply voltage 54 so as to reduce the total voltage across the load. This operation thus allows the marginal check to be either of a boost or a buck nature without there having to be a separate and different sensing circuit for each operation. However, it is therefore necessary to boost the normal supply voltage by a small amount before proceeding to buck it.

When it is desired to disconnect the bucking marginal check voltage from the load circuit, the following operation is performed. FIGURE 6 should again be referred to in order to fully understand the details of this procedure. LOWER switch 102 is depressed, thus energizing relay 10 through closed contact K4-4. Since wiper arm 21 is normally not resting upon its zero position at this time, switch 80 contacts terminal 81 and also provides a parallel circuit to the D.C. return bus from relay 10. The energizing of relay 10 causes relays 12 and 11 to be energized in that order as was explained before in connection with the boost return operation. When relay 11 becomes energized, switch 11BL opens so as to place the sense coil 52 and resistance 50 in parallel with the marginal check voltage similar to the circuit shown in FIGURE 4A, with the exception that the polarity of the marginal check voltage is reversed from that shown in this figure. Sense coil 52 immediately begins to detect a current flow which causes switch 52BL to move so as to contact terminal 92 and thus energize relay 13. Relay 14 is de-energized by the opening of switch 11AL. The operation of relays 13 and 14 are as in the boost return operation. Switch 10AU causes voltage to be applied to the marginal check motor 66 so as to return wiper arm 21 to its zero position. Since the polarity of the marginal check voltage during this time is such that any current produced by it will flow upwards through the sense coil 52 in a direction aiding the current generated by the supply voltage 54, the return of the marginal check voltage to zero does not cause the sense coil to drop out. Therefore, contactor C-1 remains open and the wiper arm eventually rests on its zero position.

At this time switch 80 contacts terminal 83 so as to energize relay 16. Relay 10 remains energized because switch K4-4 remains closed. With relay 16 being energized, switch 16AL is opened and removes voltage from the marginal check motor 66. It should be noted that although switch 8AU has been contacting its left-hand terminal during this time (since relay 8 was energized during the raise buck operation above described), the fact that switch 10AU is contacting its right-hand terminal prevents voltage from being applied to the motor through switch 8AU. Switch 16AU also closes at this time and applies an energizing voltage to terminal 73 of switch motor 70 through closed switches 10AL and 77. Switch 77 is closed because the double-pole, double-throw switch is in its DOWN position. Since relay 7 is not energized, switch 7BL contacts terminal 76 so as to cause the switch motor bar 72 to move upward and return the double-pole switch to its UP position as shown in FIGURE 1. This causes the polarity at terminals 41 and 43 to change such that terminal 41 will be positive with respect to terminal 43 when the wiper arm 21 begins to move upward again. The upward operation of the double-pole switch opens switch 77 so as to disconnect power from switch motor 70. It should be noted further that although switch 16BU in the circuit of relay 7 is closed, relay 7 is not energized since switch 8BU is open at this time.

The upward operation of the double-pole switch in FIGURE 1 also causes switch 94 to close and apply current to relay 15 through closed switches 16BU and 10BU. The operation of relay 15 opens switch 15AL and thus de-energizes relay 8. Switch 8BU thereupon closes and relay 7 is energized through closed switches 16BU, K4–3, and 12BL. Switch 7BU closes to form a holding circuit through switch 13BU. Furthermore, switch 8AU returns to contact its right-hand terminal and thus applies voltage from terminal 64 through the left-hand terminal of switch 9AU, the right-hand terminal of switch 10AU, and the right-hand terminal of switch 7AL (now energized) to terminal 69 of motor 66. The operation of motor 66 thereupon causes wiper arm 21 to move off of its zero position and increase the magnitude of the marginal check voltage. Relay 16 is now de-energized, and the opening of switch 16BU also drops relay 15.

Since the double-pole switch is now in its UP position, the polarity of the marginal check voltage is as shown in FIGURE 4A. However, the marginal check voltage is now being increased in magnitude from zero instead of being decreased as was the case in the boost return operation. In both cases, however, the polarity of the marginal check voltage is such that the current in the sense coil 52 which is generated by the power supply 54 opposes the current due to the power supply 54. Within a brief moment, the wiper arm 21 has moved so that the magnitude of this marginal check voltage is such that the sense coil 52 does not detect any current flow therethrough. At this time, switch 52BL moves to contact terminal 91, thus de-energizing relay 13 so that relay C also drops out. Contactor C–1 thereupon closes so as to effectively form the circuit shown in FIGURE 4B. The holding circuit of relay 7, formed by closed switch 13BU and closed switch 7BU which had continued to energize relay 7 after relay 16 had been de-energized, now is opened by virtue of switch 13BU opening. Switch 7AL moves to contact its left-hand terminal and so applies energizing voltage to terminal 67 of motor 66. Wiper arm 21 now begins to return to its zero position, thus reducing the magnitude of the marginal check voltage from the value which initially had caused sense coil 52 to close contactor C–1. Upon wiper arm 21 reaching its zero position, switch 80 contacts terminal 83 which energizes relay 6. Switch 6BL is opened and de-energizes relays 10, 11 and B. The contactors B–1 and B–2 are thereupon opened so as to completely disconnect marginal check power supply from the load circuit. Relay K4 is also de-energized by the opening of switch 6AL.

In re-capitulation of the buck return-to-zero operation, it may be noted that the marginal check supply voltage is initially returned to zero, its polarity is then reversed, and its magnitude is increased to a point where the sense coil 52 will detect no current flow therethrough. At this time continuity between the bias supply 54 and the load 60 is re-established by the closing of contactor C–1, after which the marginal supply voltage is returned to zero and then completely disconnected from the load circuit.

Although not shown or described, it is apparent that the marginal check power supply may be selectively connected to a number of supply voltages to be varied. A different set of B and C relays and contactors, together with one sense coil, could be provided for each such supply voltage. A selection switch could be utilized so as to cause relay 6 to select the proper B relay for operation of the B contactors associated with a particular supply voltage, and the same would hold true with the selection of the proper C relay for operation of the C–1 contactor associated with a supply voltage. With such a system, then, the marginal check voltage supply could be connected in series with a desired one of a plurality of supply voltages. Furthermore, positive supply voltages may also be varied by the arrangement of the invention if the proper polarities are taken into account.

What has been shown and described is apparatus for selectively coupling an auxiliary source of energy intermediate a load and a primary source of energy by means of control circuitry which first connects the auxiliary source of energy in shunt relationship with the normal load circuit and thereafter couples the auxiliary source of energy in series relationship with the load circuit without there being any generation of troublesome transients within the load.

What is claimed is:

1. Apparatus for selectively coupling an auxiliary source of electrical energy intermediate a load and a primary source of electrical energy, said primary source supplying said load with current in a predetermined direction, comprising a circuit including a normally closed switch coupling said primary source and said load for the passage of said current therethrough, means coupling said auxiliary source to said circuit, means to vary said auxiliary source to supply current to said circuit opposing the load current passing therethrough, and means effective when the net current in said circuit is substantially zero for opening said switch.

2. Apparatus according to claim 1 which further includes means for reversing the polarity of said auxiliary source after said switch is opened.

3. Apparatus for selectively coupling a variable auxiliary source of electrical energy intermediate a load and a primary source of electrical energy, said primary source supplying said load with current in a predetermined direction, comprising a circuit including a normally closed switch coupling said primary source and said load for the passage of said current therethrough, means coupling said auxiliary source in shunt relationship to said circuit when the magnitude of said auxiliary source is substantially zero, means for increasing the magnitude of said auxiliary source whereby said auxiliary source is effective to supply current to said circuit opposing said load current, and means effective when the net current in said circuit is substantially zero for opening said switch.

4. Apparatus according to claim 3 which further includes means for decreasing the magnitude of said auxiliary source to substantially zero after said switch is opened, means for reversing the polarity of said auxiliary source, and means for thereafter increasing the magnitude of said auxiliary source.

5. Apparatus for selectively coupling a variable auxiliary source of electrical energy intermediate a load and a primary source of electrical energy, said primary source supplying said load with current in a predetermined direction, comprising: a load circuit, including first and second portions, for normally coupling said primary source and said load for the passage of said current therethrough, a sense circuit, means coupling said auxiliary source in shunt relationship with said load circuit whereby said auxiliary source is effective to supply current to said load circuit in opposition to the current supplied to said load circuit by said primary source, said last-mentioned means further coupling said sense circuit in shunt relationship with the said first portion of said load circuit, and means controlled by said sense circuit for thereafter opening said second portion of said load circuit when the net current in said load circuit is substantially zero.

6. Apparatus according to claim 5 which further includes means for reversing the polarity of said auxiliary source after said second portion has been opened.

7. Apparatus for selectively decoupling a variable auxiliary source of electrical energy which is connected in series opposing relationship intermediate a load and a primary source of electrical energy, comprising: a current branch, means connecting said current branch in shunt relationship with said auxiliary source, means for thereafter decreasing the magnitude of said auxiliary source to substantially zero, means for thereafter reversing the polarity of said auxiliary source, means for thereafter increasing the magnitude of said auxiliary voltage whereby said auxiliary source is now effective to supply current to said current branch in opposition to current supplied said current branch by said primary source, means effective when the net current in said current branch is substantially zero for shorting a portion of said current branch, means to thereafter reduce the magnitude of said auxiliary source to zero and disconnect said auxiliary source from said current branch.

8. Apparatus for selectively de-coupling a variable auxiliary source of electrical energy which is connected in series aiding relationship with a load and a primary source of electrical energy, which includes a current branch, means connecting said current branch in shunt relationship with said auxiliary source whereby said auxiliary source is effective to supply current to said current branch in opposition to current supplied said current branch by said primary source, means for thereafter varying the magnitude of said auxiliary source so as to reduce the net current in said current branch to substantially zero value, means effective when the net current in said current branch is substantially zero for shorting a portion of said current branch, and means to thereafter reduce the magnitude of said auxiliary source to zero and disconnect said auxiliary source from said current branch.

References Cited in the file of this patent
UNITED STATES PATENTS 2,737,600  Smoot et al. _____________ Mar. 6, 1956